United States Patent [19]
Luijten et al.

[11] Patent Number: 6,044,077
[45] Date of Patent: Mar. 28, 2000

[54] METHOD AND APPARATUS FOR ATM SWITCHING

[75] Inventors: Ronald P. Luijten, Thalwil; David J. Webb, Rueschlikon, both of Switzerland

[73] Assignee: International Business Machines Corporation, Armonk, N.Y.

[21] Appl. No.: 08/860,772

[22] PCT Filed: Jan. 26, 1995

[86] PCT No.: PCT/EP95/00276

§ 371 Date: Jul. 7, 1997

§ 102(e) Date: Jul. 7, 1997

[87] PCT Pub. No.: WO96/23391

PCT Pub. Date: Aug. 1, 1996

[51] Int. Cl.[7] .............................. H04L 12/28; H04L 12/56
[52] U.S. Cl. ............................................ 370/392; 370/399
[58] Field of Search .................................... 370/395, 396, 370/394, 398, 399, 392, 416

[56] References Cited

U.S. PATENT DOCUMENTS

| | | | |
|---|---|---|---|
| 5,408,472 | 4/1995 | Hluchyj et al. | 370/416 |
| 5,450,406 | 9/1995 | Esaki et al. | 370/396 |
| 5,467,349 | 11/1995 | Huey et al. | 370/397 |
| 5,504,743 | 4/1996 | Drefenstedt | 370/395 |
| 5,546,387 | 8/1996 | Larsson et al. | 370/392 |

*Primary Examiner*—Hassan Kizou
*Assistant Examiner*—John Pezzlo
*Attorney, Agent, or Firm*—Gerald R. Woods

[57] ABSTRACT

A switch for use in an ATM network is disclosed. The switch is designed to perform a function beyond that normally achievable with a virtual path switch functioning in accordance with the ATM standard. The switch according to the invention has data stored in a look-up table (431–433) which allows it to identify communication cells of particular individual virtual channels, indicated by the virtual path identifier (VCI), although these cells cannot be distinguished on the basis of their virtual path indicators (VPIs). This identification is attempted before the usual step of forwarding an incoming communication cell based solely on its virtual path indicator. A priority circuitry (44) ensures that entries associated with the combined VPI/VCI is given a priority over those associated only with the VPI. The switch can extract cells of individual virtual channels passing through it. It can also insert virtual channels into the ATM network.

4 Claims, 3 Drawing Sheets

| ADDRESS (VPI/VCI) | INDEX |
|---|---|
| 001 004 | 1000 |
| 001 006 | 1001 |
| ⋮ | ⋮ |

*Fig. 3A*

| ADDRESS (VPI) | INDEX |
|---|---|
| 001 | 0001 |
| 002 | 0002 |
| 003 | 0003 |
| 004 | 0004 |
| 005 | 0005 |
| ⋮ | ⋮ |

*Fig. 3B*

| INDEX | ACTION | | | |
|---|---|---|---|---|
| | VPI (new) | VCI (new) | Output port | Other |
| 0001 | 101 | – | 1 | – |
| 0002 | 102 | – | 1 | – |
| 0003 | 103 | – | 2 | – |
| 0004 | 104 | – | 2 | – |
| 0005 | 105 | – | 2 | – |
| ⋮ | | | | |
| 1000 | 003 | 001 | 2 | – |
| 1001 | | (EXTRACT) | | |
| ⋮ | | | | |

*Fig. 3C*

METHOD AND APPARATUS FOR ATM SWITCHING

An Asynchronous Transfer Mode (henceforth ATM) network has switching points within the network. The "switching" performed by these switching points is in fact the action of passing on a communication received by that switching point to a further link in the network. Such switching actions are the means by which a communication is moved through the ATM network. The method and apparatus of the invention relate to a way of performing one type of switching operation at a switching point in an ATM network.

BACKGROUND OF THE INVENTION

The ATM system has a broadly accepted set of standards which ensure compatibility of ATM networks and their components. The book "ATM (broadband-ISDN) a technical overview", published as publication GG24-4330-00, can be consulted in order to gain familiarity with the ATM system.

The ATM standards define the following basic characteristics of ATM communication:

All digital information is converted into cells (henceforth simply "cells"). These cells are transferred via a transmission medium.

Each cell has a fixed data length. The cell consists of a 5-byte header and a 48-byte information field. One part of the header carries data which is termed a "Virtual Path Identifier" (henceforth the "VPI"). Another part of the header carries data termed a "Virtual Channel Identifier" (henceforth the "VCI").

FIG. 1 (prior art) illustrates the parts of the header recognised as belonging to the VPI and VCI. At certain points in the ATM network, the region of the header labelled "GFC" (Generic Flow Control) is also interpreted as part of the VPI.

The path to be followed by a cell through an ATM network is defined by a series of "look-up tables" which are prepositioned in the switching points of the network. These look-up tables contain routing information to be consulted when a cell arrives at the switch point.

The ATM network has some switching points called "Virtual Channel Switches". A "Virtual Channel Link" is the link between two successive virtual channel switches in the ATM network. A "Virtual Channel Connection" (VCC) is a route through the ATM network consisting of a particular set of virtual channel links. An example of such a virtual channel connection is the route from the point of origin of a communication in the ATM network via two or more virtual channel links to the destination of the communication in the ATM network. It should be clearly understood that the virtual channel "connection" here refers to a route through the ATM network and not to the action of making a connection.

A switching action performed at a virtual channel switch in the ATM network is made in dependence on the data in both the VPI and VCI fields of the cell's header.

The ATM network also has some switching points called "Virtual Path Switches". A "Virtual Path Link" is the link between two successive virtual path switches in the ATM network. There may be several virtual path switches within one virtual channel link. The "Virtual Path Connection" (VPC) is the route through several virtual path switches followed by a particular cell. A switching action performed at a virtual path switch in the ATM network is made in dependence on only the data in the VPI field of the cell's header. In short, a VPI bundles several VCIs.

The prior art FIG. 2 illustrates the differences in the VP and the VC switching using a layer model. The lowest level of the model consists of the physical layer, i.e., the layer on which signals are exchanged. The virtual path connection layer (ATM VP) can be regarded as being mounted on the physical layer. A virtual path connection is marked VPC. The virtual channel connection layer (ATM VC) can be seen as third layer. A virtual channel connection is marked VCC. The origin of the cells in the simplified network of FIG. 2 is marked ORIG and their destination DEST. FIG. 2 recalls that virtual channel switching and virtual path switching are separate layers in the ATM hierarchy, even though some switches may act as either virtual channel or virtual path switch. However, the standard operation of a VC/VP foresees no means to cross from the VPC layer to the VCC layer except by terminating the entire VP and redirecting all VCs contained in it.

It may be equally instructive for an accurate understanding of the current invention to review the function of the look-up tables stored at the switching points:

A cell starts at its entry point into the ATM network with a certain value stored in the VPI data field in its header. When the cell reaches the first virtual path switch, this switch reads the VPI in the header. The value of the VPI is now used either directly or indirectly to derive the address to be located in the look-up table held in the virtual path switch. The data value found at that particular address in the look-up table is then put into the cell's header in place of the original VPI. The particular exit port from the virtual path switch out of which the cell is to be sent is also determined by a value stored at the same address in the look-up table. The cell is now sent from the first virtual path switch further through the ATM network, having had its VPI value changed by the virtual path switch. At each subsequent virtual path switch in the virtual path connection a similar switching action to this takes place, i.e. the value of the VPI in the cell on arrival at the switch is accessed in the look-up table, and the value stored in the look-up table under that address is inserted into the VPI data field in the cell's header prior to sending the cell further through the network. Thus the values stored in the look-up tables at the various switching points determine the cell's route through the ATM network.

Although the VPI value can be used as the address in the look-up table, other arrangements for finding a particular entry in the table may be contemplated. It is only important that the VPI value of the incoming cell reliably leads to the location of the stored information which tells the virtual path switch how to direct that cell. In particular. an example shown later in the description splits the look-up table described above into separate tables, to be used one after the other.

By definition, all cells having the same VPI are switched together at a virtual path switch, i.e. they are all sent on with the same new VPI independently of their VCI value. Therefore several cells with different values of VCI may follow the same virtual path connection. Thus the virtual path connection can be considered to be effectively a bundle of virtual channel connections.

In general, there will be one particular look-up table in the virtual path switch for each input port to the switch. Therefore a cell arriving at the switch at one particular input port with one particular VPI value in its header will not necessarily be sent out on the same output port as a cell with the same VPI value which arrives at the same virtual path switch on a different input port.

The switching action performed at a virtual channel switch involves consulting a look-up table which has entries accessed according to the value of the VPI and VCI data fields together. Comparing the possible number of VP addresses and of VC addresses, it is obvious that a VC switch requires larger look-up tables and thus vastly more memory capacity. In practice, a VC switch requires about a thousand times more memory space than a VP switch in the same network.

There is in fact nothing in the ATM standard which prevents one switching point in the ATM network acting as both a virtual path switch and a virtual channel switch. Such dual function nodes in the ATM network fall within the scope of the present invention. For simplicity of explanation however, this description will deal only with switches which serve one of these functions.

The ATM standards for the VPI and VCI are given in "CCITT Recommendations I. 361 and 363".

ATM switching technology is also disclosed in numerous patents and patent applications. U.S. Pat. No. 5,239,537 for example describes means and methods to substitute a corrupted VP by an alternate VP. The U.S. Pat. No. 5,271,010 to Miyake describes a converter for converting the VPI and a VCI, i.e., the full 28 bit address attached to the header of an ATM cell. The converter comprises a plurality of identifier comparator units and a controller. Each of the identifier comparator units has an input identifier memory for storing an identifier attached to an ATM cell and a comparator for comparing the identifiers of an incoming ATM cell with the identifiers stored in the input identifier memory.

In view of the known ATM standard and technology, it is seen as object of the invention to provide means for selectively accessing cells having the same VPI but different VCIs. More particular, the invention aims at providing a method and a device for adding and dropping cells with a particular VCI from a VPI stream at a VP switch without having to terminate the VPI for all cells at this VP switch.

SUMMARY OF THE INVENTION

The above-mentioned objects are achieved by methods and devices having features and elements as set forth in the appended claims.

A virtual path switch in a network according to the ATM standard is envisaged as carrying out the switching action described above, i.e. consulting the address in its look-up table which corresponds to the VPI of the incoming cell, and sending on the cell at an output and with a new VPI which have been retrieved from that address in the look-up table.

The present invention gives the virtual path switch the capability of performing an additional form of switching. This switching involves extracting one or more particular virtual channel connections from the virtual path connections being routed through the switch. This extraction is, in other words, a "breaking out" or "dropping out" of one or more virtual channel connections from a VP connection. The method and apparatus according to the invention achieve this extraction with a minimum of additional memory capacity in the switch's look-up table. Thus the invention requires relatively little additional memory capacity and expense in the virtual path switch in comparison to less efficient methods of performing this breaking out operation.

The following features may be regarded as being characteristic to the invention.

A conventional VP switch usually contains memory means for storing a look-up table for addresses for all the VPI headers of cells which are to be switched onto another virtual path link towards another virtual path switch. It is further assumed that the switch contains a look-up table for addresses based on the combined VPI and VCI values of incoming cells. In the look-up table for the VCI/VPI. the addresses of those one or more virtual channels which are to be extracted at that virtual path switch are stored. For the purpose of the invention, it is not important whether these look-up tables are stored in a common or in separate memories. It is further of no importance whether the the look-up table for the VPI is part of the look-up table for the combined VCI/VPI look-up or implemented separately, whereby a higher switching speed can be achieved.

When a cell is received at the virtual path switch, both its VPI and VCI value are examined. An attempt is first made to find a corresponding address in the look-up table for VPIs and VCIs. If this attempt is successful, then this cell must belong to one of the virtual channels which is to be switched as VCs at that virtual path switch. i.e., this channel is extracted and forwarded through the ATM network after replacing in accordance with the entries in the look-up table the old VCI/VPI header by a new one. If the attempt is unsuccessful then the cell's VPI value alone is looked up in the look-up table. The cell is then forwarded through the ATM network with the new VPI value and from the output terminal of the virtual path switch which was indicated at the address in the look-up table. The invention provides in other words a priority for entries to the combined look-up table over entries of the VPI look-up table.

The simplicity and advantage of this arrangement is that the look-up table need only contain one extra entry per virtual channel to be extracted. The arrangement of the present invention involves far less memory than the prior art method of breaking out individual virtual channels at a virtual path switch, where the entire virtual path has to be divided into all its individual virtual channels, and those virtual channels which are not to be broken out at that virtual path switch are then re-bundled into a new virtual path and sent on through the ATM network. This known method requires that the VCI values of all the virtual channels of the "terminated" VP are stored in the look-up table. The invention modifies a VP switch such that it can be used as VC switch without having the full look-up table of all VPI and VCI addresses used by virtual channel switches to perform their analogous function.

In a further aspect, the invention encompasses a method and apparatus for introducing or "adding" a virtual channel into a virtual path passing through a virtual path switch. This action can be seen as being the opposite of the above described extraction of a virtual connection from a virtual path. The combination of both aspects of the invention thus provides a complete ADD/DROP for ATM cells passing through a VP switch. The details of the method and apparatus for adding the virtual channel connection will become apparent from the detailed embodiment of the invention described below in connection with the figures.

These aspects, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings:

FIGS. 3A–3C show look-up tables and a database stored at a virtual path switch in accordance with the invention;

MODE(S) FOR CARRYING OUT THE INVENTION

Figure 1:
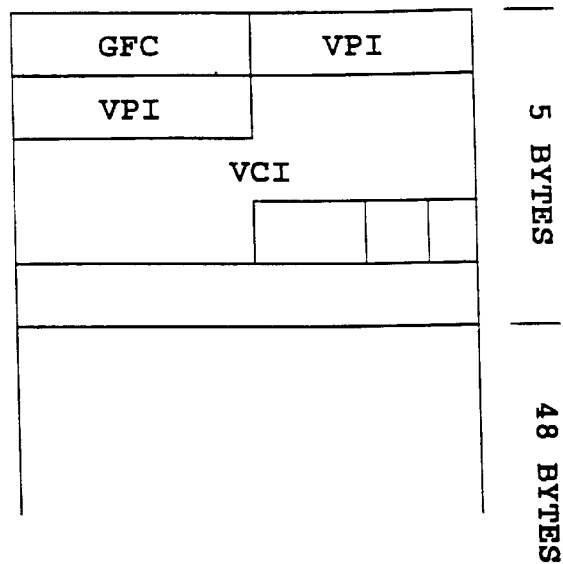
FIG. 1 shows a simplified diagram of the header of an ATM cell according to the ATM standard.
Figure 2:
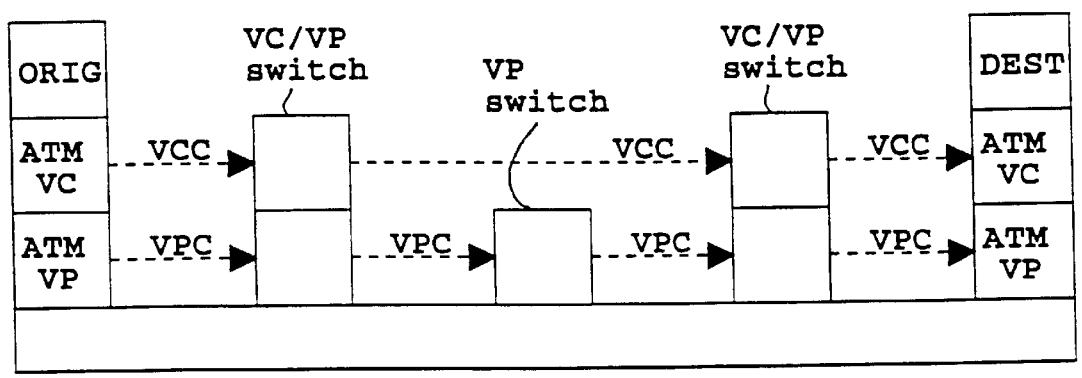
FIG. 2 shows virtual path switches and connections together with virtual channel switches and connections according to the ATM standard.

Referring to FIGS. 3A–3C, a set of tables and a database is shown which could be stored in a switch in accordance with the present invention. These tables have been simplified, e.g. by having addresses with fewer digits than is the case in an actual ATM network.

FIG. 3A shows a look-up table which is accessed using the virtual path indicator (VPI) together with the virtual channel indicator (VCI) of a cell. This is henceforth referred to as the "VPI/VCI" table. This VPI/VCI table is not foreseen by the ATM standard for inclusion in the virtual path switches of an ATM network.

In accordance with this embodiment of the invention, the VPI/VCI table contains as many entries as there are individual virtual channels which must be extracted from the ATM network at this virtual path switch. In the example shown there are two virtual channels which must be extracted—the channel whose cells have a value of 001 as their VPI and 004 as their VCI, and the channel with a VPI of 001 and VCI of 006. For simplification, the address used in the table has been shown as the combination of the VPI and VCI into a single six digit number. Many alternative combination schemes of the VPI and VCI numbers could however be used.

The index number held under each address of the VPI/VCI table can take any form. This number is merely a pointer or address to a location in the database shown in FIG. 3C.

FIG. 3B shows a look-up table which is accessed using only the virtual path indicator (VPI) of a cell. This table is henceforth referred to as the "VPI" look-up table. This table can be viewed as contributing to the function of a virtual path switch as foreseen by the ATM standard. It contains entries for the VPI values of all the virtual paths passing through the network. In the present case, it is assumed that there are five virtual paths which pass through the virtual path switch, and they have been numbered 001 to 005. Note that there may be many individual virtual channels with just one of these VPI values. This is however not of importance in the decision of how to direct these channels onwards through the network if they are not to be extracted at the switch. Therefore table 3B does not contain any VCI numbers in its indexing scheme. The VPI table shown in FIG. 3B has under each address an index number which refers to an address in the database of FIG. 3C.

FIG. 3C shows a database. This database contains the associated information or instructions for handling a cell received by the virtual path switch. The associated information are accessed using as addresses the index numbers which were found in either table 3A or table 3B. The associated information in the table have been simplified as to containing new VPI and VCI values as well as information concerning the output port of the switch for cells which are to be sent on further through the ATM network. Usually for those VCI appearing in the table of FIG. 3A, i.e., the virtual channels marked for dropping, new VCI/VPI are provided and the affected cells are sent on further through the ATM net. The invention however contemplates using other instructions than those necessary for passing on the cells to another node within the ATM network. These instructions are labeled as "(EXTRACT)" in the database of FIG. 3C. These values are available for cells which belong to virtual channels which are to be extracted at the virtual path switch. The exact form of this would depend on what is to be done with the virtual channel. The cells of the extracted virtual channel may for example simply be used locally.

Figure 4:
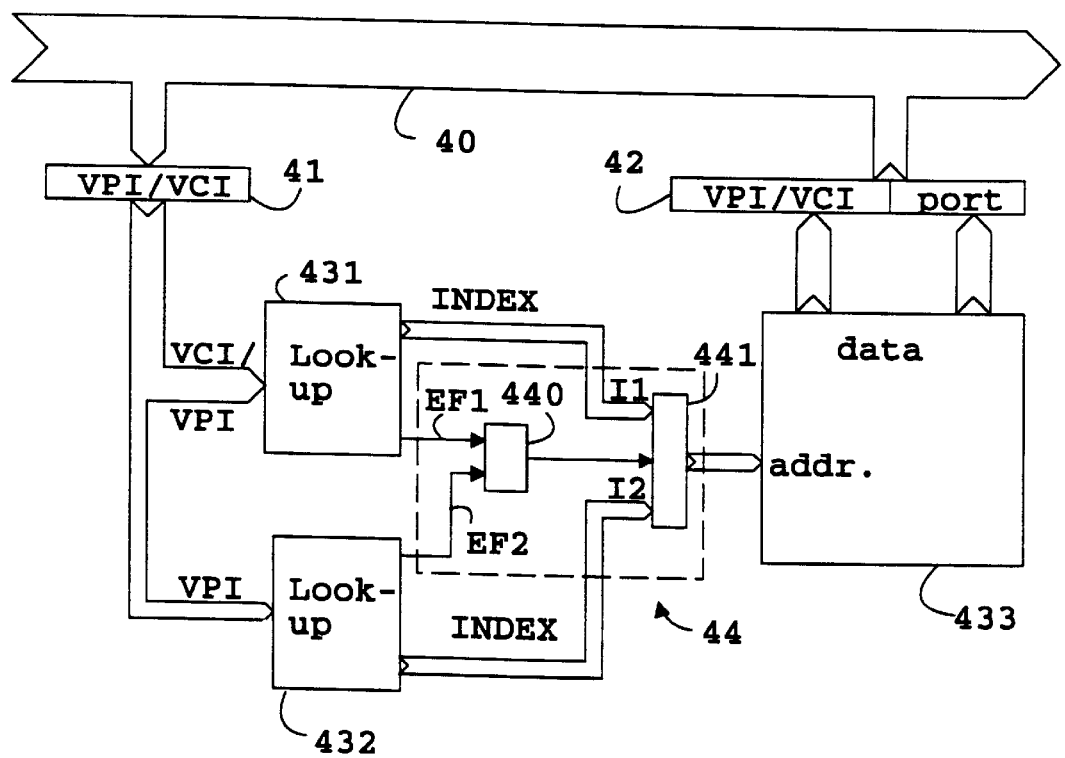
FIG. 4 shows basic elements of an embodiment in accordance with the present invention.

FIG. 4 shows an embodiment of the apparatus according to the invention in operation. Memory blocks 431–433 are shown to store the tables discussed above in connection with FIG. 3. The combined VCI/VPI table is preferably implemented as associative memory, which facilitates the handling of a comparatively small selection from a vast number of possible entries. The apparatus comprises portions 41, 42 for extracting and inserting the header of cells into the data stream carried by a cell data bus 40. These portions as the memory means are in principle known. The invention adds means 44 which effectively give-in case that an entry is found in both look-up tables 431, 432—priority to the index found in the combined VCI/VPI table 431. The priority circuitry 44 can easily be implemented by suitable logical gates, latches, and/or programmable devices. In the described embodiment, a gate 440 controls the latch 441 such that the index of table 431 addresses the database 433 when the entry found lines EF1, EF2 are both high. The exact truth table of the priority circuitry 44 is:

| EF1 | EF2 | OUT |
|---|---|---|
| 0 | 0 | x |
| 1 | 0 | I1 |
| 0 | 1 | I2 |
| 1 | 1 | I1 |

Quite clearly the embodiment explained above in connection with FIGS. 3 and 4 only shows one variant of the present invention. In particular, the exact allocation of the information held amongst the tables and database can be varied. It is however important that the switch contain information allowing it to recognise an incoming cell of a virtual channel which is to be extracted, on the basis of the VPI and VCI data values in the cell's header. It is also important that only for these cells does both VPI and VCI data need to be held in the switch. This contrasts with the data requirements of both virtual path switches and virtual channel switches known from the prior art. The sequence of steps employed to compare the VPI and VCI values with the values held in the tables and database can also be varied.

The arrangement of the invention explained in connection with FIGS. 3 and 4 shows an extraction of virtual channels from an ATM network. The invention is however equally capable of inserting one or more virtual channels into an ATM network. This embodiment of the invention would for example be useful when a local source wishes to insert a virtual channel at the location of a virtual path switch, or when it is desired to "splice in" a connection from another ATM network at the site of a virtual path switch.

In order to insert a virtual channel into an ATM network, it is necessary to provide the header of each cell of that virtual channel with VPI and VCI values for its passage through the ATM network, and to feed it into the ATM network through the appropriate output port of the virtual path switch. All of this information can be stored in a database of the form of that shown in FIG. 3C. Access to the database needs to be via a look-up table which yields index numbers in a manner similar to that of the table in FIG. 3A, but which is indexed by the existing VPI and VCI values of the virtual channels to be added to the network, or some similar identifying parameter.

We claim:

1. An Asynchronous Transfer Mode (ATM) switch including:
   a first look-up table having a plurality of storage locations for cell switching information, each of said storage locations being addressable by a particular combination of Virtual Path Identifier (VPI) and Virtual Channel Identifier (VCI) values;
   a second look-up table having a plurality of storage locations for cell switching information, each of said storage locations being addressable by a particular VPI value;
   an addressing subsystem for determining whether the first look-up table includes a storage location addressable by a combination of VPI and VCI values in a cell being processed and for simultaneously determining whether the second look-up table includes a storage location addressable by a VPI value in the same cell;
   priority logic responsive to the detection of an addressable storage location in the first look-up table to select cell switching information contained in the first look-up table, said priority logic selecting cell switching information contained in the second look-up table only where an addressable storage location is not detected in the first-lookup table; and
   cell processing logic for processing the received cell using the cell switching information selected by the priority logic.

2. A switch as set forth in claim 1 wherein the cell switching information stored in the first and second look-up tables comprises index values and wherein the switch further includes a database having a plurality of storage locations addressable using the index values, each of said database storage locations including data for directing the cell being processed along a particular virtual path or virtual channel.

3. A method as set forth in claim 2 comprising additional steps for permitting cells having a particular VCI value to be inserted at a switch having one or more virtual paths therethrough, said additional steps including:
   establishing a look-up table having a plurality of storage locations addressable using particular combinations of VCI and VPI values, each of said storage locations including cell switching information;
   seeking a storage location addressable by VCI and VPI values in a cell available for insertion; and
   processing the cell in accordance with the information stored in any such cell.

4. For use in an ATM switch, a method of separating ATM cells having a particular virtual channel identifier (VCI) from a virtual path along which the cells had been traveling, said method comprising the steps of:
   simultaneously examining the contents of the VPI (virtual path identifier) and VCI fields of the cell;
   addressing first and second look-up tables in parallel using the results of said examining step;
   where the cell is found to have non-zero values in both the VPI and VCI fields, extracting cell switching information from the first look-up table using both the VPI and VCI values;
   where the cell is found to have a non-zero value only in the VPI field, extracting cell switching information from the second look-up table using the VPI value; and
   using the extracted cell switching information to direct the cell toward its intended destination.

* * * * *